United States Patent
Gölzhäuser et al.

(10) Patent No.: US 9,458,019 B2
(45) Date of Patent: Oct. 4, 2016

(54) GRAPHITE LAYERS

(71) Applicant: Universität Bielefeld, Bielefeld (DE)

(72) Inventors: Armin Gölzhäuser, Bielefeld (DE); Andrey Turchanin, Jena (DE)

(73) Assignee: Universität Bielefeld, Bielefeld (DE)

( * ) Notice: Subject to any disclaimer, the term of this patent is extended or adjusted under 35 U.S.C. 154(b) by 0 days.

(21) Appl. No.: 14/735,476

(22) Filed: Jun. 10, 2015

(65) Prior Publication Data

US 2015/0274530 A1    Oct. 1, 2015

Related U.S. Application Data

(63) Continuation of application No. 12/675,285, filed as application No. PCT/EP2008/007203 on Sep. 3, 2008, now abandoned.

(30) Foreign Application Priority Data

Sep. 3, 2007 (DE) .................. 10 2007 041 820

(51) Int. Cl.
*C01B 31/04* (2006.01)
*B82Y 30/00* (2011.01)
*B82Y 40/00* (2011.01)

(52) U.S. Cl.
CPC ............... *C01B 31/04* (2013.01); *B82Y 30/00* (2013.01); *B82Y 40/00* (2013.01); *C01B 31/0446* (2013.01); *C01B 2204/02* (2013.01); *C01B 2204/04* (2013.01)

(58) Field of Classification Search
CPC .................................................... C01B 31/022
USPC ............................................. 423/448, 445 R
See application file for complete search history.

(56) References Cited

U.S. PATENT DOCUMENTS 4,915,984 A    4/1990    Murakami

OTHER PUBLICATIONS

Turchanin, A., et al., "High Thermal Stability of Cross-Linked Aromatic Self-Assembled Monolayers: Nanopatterning Via Selective Thermal Desorption", Applied Physics Letters, Jan. 29, 2007, vol. 90(5), pp. 053102-1-053102-3.
Eck, W., et al., "Freestanding Nanosheets from Crosslinked Biphenyl Self-Assembled Monolayers", Advanced Materials, Nov. 4, 2005, vol. 17(21), pp. 2583-2587.
Novoselov, K.S., et al., "Electric Field Effect in Atomically Thin Carbon Films", Science, Oct. 11, 2004, vol. 306 (5696), pp. 666-669.
Frey, S., et al., "Structure of Thioaromatic Self-Assembled Monolayers on Gold Silver", Langmuir, 2001, vol. 17, pp. 2408-2415.
Geyer, W., et al., "Electron-Induced Crosslinking of Aromatic Self-Assembled Monolayers: Negative Resists for Nanolithography", Applied Physics Letters, vol. 75(16), Oct. 1999, pp. 2401-2403.
Houmam, A., et al., "Physical Structure of Standing-Up Aromatic SAMs Revealed by Scanning Tunneling Microscopy", Langmuir, 2011, vol. 27, pp. 13544-13553.
Sabatani, E., et al., "Thioaromatic Monolayers on Gold: A New Family of Self-Assembling Monolayers", Langmuir, 1993, vol. 9, pp. 2974-2981.
Turchanin, A., et al., "One Nanometer Thin Carbon Nanosheets with Tunable Conductivity and Stiffness", Advance Materials, 2009, vol. 21, pp. 1233-1237.
Turchanin, A., et al., "Conversion of Self-Assembled Monolayers into Nanocrystalline Graphene: Structure and Electric Transport", ACS Nano, 2011, vol. 5, pp. 3896-3904.
Ferrari et al., "Raman Spectrum of Graphene and Graphene Layers", The American Physical Society, PRL 97, 187401 (2006).
Rao et al., "Graphene: The New Two-Dimensional Nanomaterial", Angew. Chem. Int. Ed., 2009, vol. 48, pp. 7752-7778.
Dahn, et al., "Mechanisms for Lithium Insertion in Carbonaceous Materials", Science, 1995, vol. 270, pp. 590-593.
Scientific Background on the Nobel Prize in Physics, 2010, The Royal Swedish Academy of Sciences, Oct. 5, 2010, pp. 1-10.
Modifying Monolayers, Appl. Phys. Lett., vol. 90, 053102 (2007).

*Primary Examiner* — Daniel C McCracken
(74) *Attorney, Agent, or Firm* — McDonnell Boehnen Hulbert & Berghoff LLP

(57) ABSTRACT

The present invention relates to a method for preparing graphite layers, comprising the step of heating at least one monolayer with low-molecular weight aromatics and/or low-molecular weight heteroaromatics crosslinked in the lateral direction under vacuum or inert gas to a temperature of >800 K, and to graphite layers which are obtainable by this method.

13 Claims, No Drawings

GRAPHITE LAYERS

This application is a continuation of U.S. patent application Ser. No. 12/675,285, filed Feb. 25, 2010, now abandoned, which is a section 371 of international application PCT/EP2008/007203, filed Sep. 3, 2008, which claims priority from German patent application no. 102007041820.7, filed Sep. 3, 2007, which is incorporated by reference in its entirety.

FIELD

The present invention relates to a method for preparing graphite layers, comprising the step of heating at least one monolayer with low-molecular weight aromatics and/or low-molecular weight heteroaromatics, which are crosslinked in the lateral direction, under vacuum or inert gas to a temperature of >800 K, and to graphite layers obtainable by this method.

BACKGROUND

Thin graphite layers are known in the art and are either obtained by peeling from a high-purity graphite crystal, by pyrolysis of silicon carbide, by heating $C_2H_6$ to Pt(111), or from graphene oxides. However, these methods for preparing graphite layers are subject to severe limitations and can only be applied to a limited extent.

SUMMARY

Thus, it is the object of the present invention to provide a novel method for preparing ultra-thin graphite layers, which also is to enable a targeted, lateral structuring of a substrate surface in the nanometer range. In particular, the method serves to enable the preparation of structures of graphite layers in the nanometer range on different substrates.

This object is solved by the embodiments characterized in the claims.

DETAILED DESCRIPTION

In particular, a method for preparing graphite layers is provided, comprising the step of heating at least one monolayer with low-molecular weight aromatics and/or low-molecular weight heteroaromatics, which are crosslinked in the lateral direction, under vacuum or inert gas to a temperature of >800 K.

According to the present invention, the term "graphite layer" means an electrically conductive layer largely composed of carbon, which consists of several atomic layers, preferably 1 to 3 atomic layers, and may optionally have dopants. Preferably, the graphite layer according to the present invention is a layer composed of carbon, which consists of 1 to 3 atomic layers and may as well be referred to as graphene layer. The layer thickness of the graphite layer according to the present invention is preferably below 2 nm.

The monolayer with low-molecular weight aromatics and/or low-molecular weight heteroaromatics crosslinked in the lateral direction, or laterally crosslinked monolayer, can be prepared by crosslinking low-molecular weight aromatics and/or low-molecular weight heteroaromatics, which preferably have anchor groups. Preferably, the laterally crosslinked monolayer is prepared by treating a (non-crosslinked) monolayer of low-molecular weight aromatics and/or low-molecular weight heteroaromatics, which preferably have anchor groups, with high-energy radiation.

In the method according to the present invention, the monolayer, which can in particular be crosslinked by being treated with high-energy radiation, is preferably composed of aromatics selected from the group consisting of phenyl, biphenyl, terphenyl, naphthalene and anthracene, and/or of heteroaromatics selected from the group consisting of bipyridine, terpyridine, thiophene, bithienyl, terthienyl and pyrrole.

Crosslinking of the monolayer in the lateral direction preferably is carried out with high-energy radiation. In particular, crosslinking of the monolayer in the lateral direction can be achieved by treatment with electron radiation, plasma radiation, X-ray radiation, β-radiation, γ-radiation, VUV radiation, EUV radiation or UV radiation.

The low-molecular weight aromatics and/or low-molecular weight heteroaromatics preferably have anchor groups. If the low-molecular weight aromatics and/or low-molecular weight heteroaromatics have anchor groups, the monolayer of low-molecular weight aromatics and/or low-molecular weight heteroaromatics can be bonded to a plurality of substrates as a monolayer in a simple manner. Bonding of the crosslinked monolayer to a substrate can be achieved by physisorption (i.e. with a bond energy of approx. 0.5 eV/atom or <41.9 kJ/mop or by chemisorption (i.e. with a bond energy greater than 0.5 eV/atom or ≥41.9 kJ/mol), for example by forming covalent bonds. The anchor groups can be selected from the group consisting of carboxy, thio, trichlorosilyl, trialkoxysilyl, phosphonate, hydroxamic acid and phosphate groups. The anchor groups can be covalently bonded to the monolayer composed of low-molecular weight aromatics and/or low-molecular weight heteroaromatics, which are crosslinked in the lateral direction, by means of a spacer with a length of 1 to 10 methylene groups.

The skilled person is capable of suitably tailoring the nature of the anchor group to the respective desired substrate material. For example, trichlorosilane or trialkoxysilane, such as trimethoxysilane, triethoxysilane, etc., are particularly suitable as anchor groups for oxidized silicon surfaces. Alcohol groups can be used for anchoring for hydrogenated silicon surfaces. For gold and silver surfaces, thio groups are possible anchor groups, and for oxidized metal surfaces such as iron or chromium, phosphonic acids, carboxylic acids, or hydroxamic acids are suitable.

The laterally crosslinked monolayer, which can be prepared by treating a monolayer composed of low-molecular weight aromatics and/or low-molecular weight heteroaromatics with high-energy radiation, can be chemisorbed or physisorbed on a substrate, or be free-standing or not bonded to a substrate surface.

A laterally crosslinked monolayer, which is chemisorbed or covalently bonded on a substrate, can be prepared by applying a monolayer composed of low-molecular weight aromatics and/or low-molecular weight heteroaromatics, which preferably have anchor groups, to a substrate, and by being treated with high-energy radiation.

If desired, the laterally crosslinked monolayer can be transferred to another substrate by means of a suitable transfer medium. For example, a laterally crosslinked monolayer applied to a gold substrate, silicon substrate or silicon nitride substrate can be transferred to another substrate, preferably a thermally stable substrate, such as silicon oxide, aluminium oxide, glass, platinum, iridium, tungsten or molybdenum, by means of a suitable transfer medium.

A laterally crosslinked monolayer, which is free-standing or not bonded to a substrate surface, can be prepared by applying a monolayer composed of low-molecular weight aromatics and/or low-molecular weight heteroaromatics, which preferably have anchor groups, to a substrate, by being treated with high-energy radiation and by cleaving the bonds between the crosslinked monolayer and a substrate, preferably by cleaving a covalent bond between anchor groups of the crosslinked monolayer and a substrate. A skilled person is capable of selecting suitable conditions for cleaving the bond between the crosslinked monolayer and the substrate. For example, the bond between a crosslinked monolayer composed of biphenylthiol and gold as a substrate can be cleaved by treatment with iodine vapor.

In another embodiment, a laterally crosslinked monolayer, which is free-standing or not bonded to a substrate surface, can be prepared by applying a monolayer composed of low-molecular weight aromatics and/or low-molecular weight heteroaromatics to a sacrificial layer or intermediate layer on a substrate, by being treated with high-energy radiation and by dissolving the sacrificial layer or intermediate layer between the crosslinked monolayer and a substrate. A skilled person is capable of selecting suitable materials for such sacrificial layers disposed between the crosslinked monolayer and the substrate. For example, a silicon nitride layer as a sacrificial layer between a crosslinked monolayer and a substrate, such as silicon, can be removed by treatment with hydrofluoric acid.

Cleavage of the bonds between a laterally crosslinked monolayer and a substrate and dissolving of a sacrificial layer or intermediate layer between a laterally crosslinked monolayer and a substrate can e.g. be carried out as in Advanced Materials 2005, 17, 2583-2587, but are not limited thereto. By means of these techniques, it is e.g. possible to prepare a laterally crosslinked monolayer, which is free-standing or not bonded to a substrate surface, which monolayer can be used for the preparation of graphite layers in the inventive step of heating at least one monolayer with low-molecular weight aromatics and/or low-molecular weight heteroaromatics, which are crosslinked in the lateral direction, under vacuum or inert gas to a temperature of >800 K.

The substrate can have recesses in some areas. For example, it is possible for the substrate to have holes, depressions or grooves. The substrate may as well be lattice-shaped or have a lattice-like shape. Preferably, the substrate is composed of a thermally stable material, such as tungsten. A graphite layer prepared according to the present invention can be supported on a substrate or merely rest on a substrate, and overspan or cover recesses in the substrate at least in some areas.

According to one embodiment of the present invention, it is possible for the laterally crosslinked monolayer to be prepared by crosslinking low-molecular weight aromatics and/or low-molecular weight heteroaromatics, which preferably have anchor groups, on a first substrate, such as gold, silicon or silicon nitride, to subsequently transfer the laterally crosslinked monolayer to a second, thermally stable substrate, such as silicon oxide, aluminium oxide, glass, platinum, iridium, tungsten or molybdenum, and to then heat it to a temperature of >800 K under vacuum or inert gas on this thermally stable substrate.

However, it is also possible for the laterally crosslinked monolayer to be prepared by crosslinking low-molecular weight aromatics and/or low-molecular weight heteroaromatics, which preferably have anchor groups, on a first substrate, such as gold, silicon, silicon nitride, platinum or iridium, to then heat the laterally crosslinked monolayer to a temperature of >800 K under vacuum or inert gas on said substrate, and to subsequently transfer it to a second substrate, such as silicon oxide or glass.

In a particularly preferred embodiment of the present invention, the laterally crosslinked monolayer is prepared by crosslinking low-molecular weight aromatics and/or low-molecular weight heteroaromatics, which preferably have anchor groups, on a substrate, such as silicon oxide, and the laterally crosslinked monolayer is heated to a temperature of >800 K under vacuum or inert gas on said substrate in order to form an electrically conductive graphite layer on silicon oxide. In this way, it is e.g. possible to prepare an electrically conductive layer on insulator surfaces, such as glass. Such arrangements can be applied in monitors and/or solar cells, for example.

The substrate can be selected from the group consisting of gold, silver, titanium, zirconium, vanadium, chromium, manganese, tungsten, molybdenum, platinum, aluminium, iron, steel, silicon, germanium, indium phosphide, gallium arsenide and oxides or alloys or mixtures thereof, as well as graphite, indium tin oxide (ITO) and silicate or borate glasses.

In one embodiment of the present invention, the monolayer composed of the low-molecular weight aromatics and/or low-molecular weight heteroaromatics can carry functional groups on its surface, the groups being selected from halogen atoms, carboxy, trifluoromethyl, amino, nitro, cyano, thiol, hydroxy or carbonyl groups. The low-molecular weight aromatic and/or low-molecular weight heteroaromatic molecules or units, which make up the monolayer, can be chemically coupled to an underlying substrate surface or be covalently bonded thereto by means of an anchor group.

In a particularly preferred embodiment of the present invention, a monolayer composed of biphenyl units can be covalently bonded to a corresponding substrate surface, in particular of gold or silver, via thio groups as anchor groups.

The monolayer, which can be crosslinked by being treated with high-energy radiation, has a thickness of only several atomic layers, wherein a layer thickness in the range from 0.3 nm to 3 nm is preferred.

If the surface of a substrate material is atomically flat and homogeneous, i.e. it does not have any edge dislocation or defects, then the graphite layer is also atomically flat, homogeneous and free of defects and forms an almost ideally smooth film on a substrate surface. The graphite layer adapts to the morphology of the substrate. In this way, objects having three-dimensional surface morphologies can be covered with a graphite layer of defined thickness as well.

According to a preferred embodiment of the present invention, the inventive method for preparing graphite layers comprises the steps of:
  providing a substrate,
  optionally modifying the surface of the substrate,
  applying a monolayer of low-molecular weight aromatics and/or low-molecular weight heteroaromatics to a surface of the substrate using covalent bonding via anchor groups or physisorption,
  treating the obtained substrate with high-energy radiation at least in some areas such that the monolayer composed of low-molecular weight aromatics and/or low-molecular weight heteroaromatics, which is bonded to the surface of the substrate in a covalent manner or by physisorption, is covalently crosslinked in the lateral direction (at the areas treated with high-energy radiation),
  optionally transferring the laterally crosslinked monolayer from the above-described substrate to another, preferably thermally stable substrate, and heating the laterally crosslinked monolayer, which is prepared by treating the monolayer composed of low-molecular weight aromatics and/or low-molecular weight heteroaromatics with high-energy radiation at least in some areas, under vacuum or inert gas to a temperature of >800 K.

The term "thermally stable substrate" means a substrate that is stable in the step of heating the laterally crosslinked monolayer under vacuum and that remains substantially unchanged. A thermally stable substrate is stable at >800 K, preferably >1000 K, particularly preferably >1600 K, and more preferably >2000 K, and does basically not change. Most preferably, the thermally stable substrate is thermally stable even at >3000 K and remains substantially unchanged in the heating step.

The prepared graphite layer can directly remain on a substrate or, for example by dissolving a sacrificial layer disposed between the prepared graphite layer and a substrate, be disposed on a substrate in analogy with the aforementioned. Furthermore, it is possible for the prepared graphite layer to be disposed on a substrate in a free-standing manner. In particular, this can be realized by employing a free-standing, laterally crosslinked monolayer in the step of heating the laterally crosslinked monolayer under vacuum or inert gas to a temperature of >800 K.

The applied monolayer is covalently crosslinked in the lateral direction when being treated with high-energy radiation, preferably X-ray radiation, β-radiation, γ-radiation, VUV radiation, EUV radiation or UV radiation, so that a physisorbed or covalently bonded, thin and stable layer is created on the substrate surface. By crosslinking in the lateral direction, the monolayers composed of the low-molecular weight aromatics and/or low-molecular weight heteroaromatics obtain high mechanical and chemical stability and effectively protect the underlying substrate surface against damage or corrosive substances. In addition, a laterally crosslinked monolayer, which is physisorbed or covalently bonded to the surface of a substrate via anchor groups and which can be prepared by treating a monolayer composed of low-molecular weight aromatics and/or low-molecular weight heteroaromatics with high-energy radiation, is thermally stable and exhibits excellent adhesion to a suitable substrate.

In one embodiment of the method according to the present invention, crosslinking can be carried out using lateral structuring by means of fine-focussed, ionizing electron, ion or photon radiation. The focusing and scanning of the beam across the areas to be structured can be performed by electron-optical or ion-optical elements, such as in electron beam lithography with scanning electron microscopes or in lithography with focused ions (FIB). Preferably, the structuring can also be carried out by means of local probe processes. Here, the focusing of electrons, ions or photons is ensured by the smallness of the electron, ion or photon source (local probe). The local probe is then guided across the areas to be structured in distances between 0.1 nm and 1000 nm. Particularly suitable local probes for electrons include the tips of scanning tunneling microscopes (STM), atomic force microscopes (AFM) and atomically defined field emitter tips, which e.g. have been produced by the method of Müller et al. (Ultramicroscopy 50, 57 (1993)). The latter are particularly suitable as local probes for structuring with larger distances (>10 nm) between probe and sample, and can also be used as field ion sources. Fine tips made of glass or another photon-conducting material, as are used in near-field optical microscopes (SNOM), are suitable for structuring with photons. In all local probe methods, the local probe is positioned directly over the areas to be exposed by means of a positioning device, for example one made of piezoceramic elements.

If, instead of applying a monolayer of low-molecular weight aromatics and/or low-molecular weight heteroaromatics, for example saturated or physisorbed molecules or units or molecules or units that are covalently bonded to a substrate surface via an anchor group are applied, said molecules or units including e.g. cyclohexyl, bicyclohexyl, tercyclohexyl, partially or completely hydrogenated naphthalene or anthracene, or partially or completely hydrogenated heteroaromatics, then dehydrogenation to the corresponding aromatics or heteroaromatics can occur in addition to crosslinking in the lateral direction in the treatment with high-energy radiation. If nitro groups are bonded to the surface of the monolayer composed of low-molecular weight aromatics and/or low-molecular weight heteroaromatics, then in the method according to the present invention, these nitro groups can as well be converted to amino groups in the region of action of the crosslinking radiation.

In a further embodiment of the method according to the present invention, the treatment with high-energy radiation can be carried out using a shadow mask such that only spatially defined areas of the monolayer applied to the substrate surface are exposed or irradiated, whereby a structured surface is formed on the substrate with protected and unprotected areas, i.e. the exposed areas are protected and the unexposed areas are unprotected. The product produced according to the present invention can thus also be used as a negative resist.

The physisorbed or covalently bonded or chemisorbed low-molecular weight aromatics and/or low-molecular weight heteroaromatics, which are preferably bonded via anchor groups, (i.e. which are not part of the laterally crosslinked monolayer), present at unexposed or non-irradiated areas, can subsequently be removed. This can be done e.g. by a thermal treatment, by treatment with a suitable solvent, or by treatment with a suitable desorbent. By means of the above-described structuring methods using high-energy radiation, it is possible to create a laterally crosslinked monolayer with a structuring or patterning in the nanometer range. If the adsorbed or covalently bonded low-molecular weight aromatics and/or low-molecular weight heteroaromatics, which are preferably bonded via anchor groups, present at unexposed or non-irradiated areas, are subsequently removed and the resulting substrate is afterwards heated under vacuum or inert gas to a temperature of >800 K, then graphite layers or graphene layers with a structuring or patterning in the nanometer range can be created.

In another embodiment, it is possible to not remove the adsorbed or covalently bonded low-molecular weight aromatics and/or low-molecular weight heteroaromatics, which are preferably bonded via anchor groups, present at unexposed or non-irradiated areas, and to directly heat the resulting substrate under vacuum or inert gas to a temperature of >800 K. In this approach, the adsorbed or covalently bonded low-molecular weight aromatics and/or low-molecular weight heteroaromatics, which are preferably bonded via anchor groups, are thermally desorbed and the laterally crosslinked aromatics and/or heteroaromatics forming the crosslinked monolayer are converted to graphite layers or graphene layers having a structuring or patterning in the nanometer range. Thereby, it has been possible for the first time to create graphite layers or graphene layers with a targeted structuring or patterning in the nanometer range on a substrate.

For irradiation with electrons, a large-area illuminating electron source can be used, e.g. a "flood gun" or a construction as described in FIG. 2 of Hild et al., Langmuir, 14, 342-346 (1998). The electron energies used can be adapted to the respective organic films and their substrates over a broad range, preferably from 1 to 1000 eV. For example, electron radiation of 50 eV or 100 eV can be used for crosslinking 1,1'-biphenyl-4-thiol on gold.

For lateral structuring, a large-area illuminating electron source in combination with a shadow mask can be used, so that only the open areas are exposed to the electrons. Also suitable for lateral structuring are focused electron beams, which can be positioned over the areas to be crosslinked by a scanning electron microscope. Moreover, electron sources such as field emitter tips, from which electrons are emitted in a small angular range, can be directly used if they are positioned over the areas to be crosslinked by means of suitable displacement elements (step motors, piezotranslators).

For large-area crosslinking by means of electromagnetic radiation (e.g. X-ray radiation, UV radiation), light sources available in the prior art can be used. For lateral structuring, masks suitable for the respective wavelength range or scanning by means of suitable light guides are possible.

The surface of a substrate can be cleaned or chemically modified before the monolayer is applied. Cleaning can be carried out by simple rinsing of the surface with water or organic solvents, such as ethanol, acetone or dimethylformamide, or by treatment with an oxygen plasma generated by UV radiation. If the monolayers with anchor groups, such as phophonic acid, carboxylic acid, or hydroxamic acid groups, are to be applied to oxidized metal surfaces, prior controlled oxidation of the metal surface is advantageous. This can be done by treatment of the metal surface with oxidizing agents, such as hydrogen peroxide, Caro's acid, or nitric acid. A further possibility for modifying a substrate surface is to apply a first organic monolayer with terminal reactive groups, such as amino, hydroxy, chloro, bromo, carboxy or isocyanate groups, to which the monolayer actually to be crosslinked is chemically coupled by means of suitable functional groups in a second step.

The application of the monolayer of low-molecular weight aromatics and/or low-molecular weight heteroaromatics to a substrate can e.g. be carried out by dipping, casting, spin-coating methods, by adsorption from dilute solution, or by vacuum vapor deposition.

According to an embodiment of the method of the present invention, heating of the at least one monolayer with laterally crosslinked low-molecular weight aromatics and/or heteroaromatics is carried out under vacuum. The vacuum applied in the method for preparing graphite layers is selected such that oxidation and/or contamination with undesired foreign atoms of the laterally crosslinked monolayer and the resulting graphite layer can be effectively prevented in the heating step. Therefore, in the method for preparing graphite layers, a pressure of <1 mbar is applied, wherein a pressure of $<10^{-2}$ is preferred and a pressure of $<10^{-3}$ is particularly preferred. In the method for preparing graphite layers, a vacuum in a pressure range from $10^{-2}$ mbar to $10^{-12}$ mbar has turned out to be particularly suitable, wherein a vacuum in a pressure range from $10^{-7}$ mbar to $10^{-12}$ mbar (ultrahigh vacuum) is particularly well suitable.

In another embodiment of the method according to the present invention, heating of the at least one monolayer with laterally crosslinked low-molecular weight aromatics and/or heteroaromatics is carried out under inert gas, wherein within the scope of the present invention the term "inert gas" also means mixtures of an inert gas and hydrogen. The inert gas can be any suitable inert gas or its mixture with hydrogen. Preferably, argon or a mixture of argon and hydrogen is used.

Heating of the laterally crosslinked monolayer, which can be formed by treating a monolayer composed of low-molecular weight aromatics and/or low-molecular weight heteroaromatics with high-energy radiation, is carried out at a temperature of >800 K. Heating of the laterally crosslinked monolayer is preferably done at a temperature of >1000 K, and a temperature of >1300 K is particularly preferred. Even more preferably, the temperature is >1600 K. If heating is carried out at higher temperatures (i.e. at temperatures of >1600 K), it is preferred to not use molybdenum or tungsten as the substrate, since they react with the graphite layers according to the present invention at those temperatures, thus forming carbides.

According to a further preferred embodiment of the method of the present invention, heating of the laterally crosslinked monolayer, which can be formed by treating a monolayer composed of low-molecular weight aromatics and/or low-molecular weight heteroaromatics with high-energy radiation, can be carried out at a temperature of >2000 K, in particular at a temperature of >2500 K or a temperature of >3000 K.

The upper temperature limit for the step of heating the laterally crosslinked monolayer, which can be formed by treating a monolayer composed of low-molecular weight aromatics and/or low-molecular weight heteroaromatics with high-energy radiation, is determined by the sublimation temperature of carbon and the melting temperature or decomposition temperature of the substrate used.

Furthermore, according to the present invention, a graphite layer or graphene layer is provided that can be obtained by means of the above-defined method of the present invention. The graphite layer that can be prepared according to the method of the present invention is preferably electrically conductive.

The graphite layer according to the present invention preferably has a layer thickness of <2 nm. Preferably, the graphite layer prepared according to the present invention is an electrically conductive graphite layer.

By use of the method according to the present invention, it is possible, in particular by means of lithographic techniques, to prepare laterally crosslinked monolayers of arbitrary shape and size, which can be converted to graphite layers of arbitrary shape and size.

By selection of suitable process parameters for the lateral crosslinking (e.g. energy and dose) and the temperature and/or pressure, chemical purity (e.g. the number of foreign atoms) and structural defects in the graphite layers can be controlled.

The use of chemically functionalized monolayers enables the preparation of chemically doped and/or chemically functionalized graphite layers.

The fields of application of the graphite layers according to the present invention are nanoscopic electrical conductors, conductive membranes in miniaturized pressure sensors (e.g. nanomicrophones), pads in electron microscopy, doping of graphene for adjusting the electrical conductivity and chemical functionalization of graphene, for example for substance separation (e.g. as a membrane or filter).

The present invention will be explained in more detail by the following examples.

EXAMPLES

A) Preparation of a Laterally Crosslinked Monolayer by Treatment of Monolayer Composed Low-Molecular Weight Aromatics and/or Low-Molecular Weight Heteroaromatics with High-Energy Radiation

Example A1

A monolayer of 4-biphenylthiol on gold is prepared by placing a silicon wafer with a 100 nm-thick vapor-deposited gold layer in a 1 mmolar ethanolic solution of 4-biphenylthiol for one hour. Subsequently, the wafer is taken out, rinsed several times with ethanol p.a. and dried in a stream of nitrogen. To crosslink the layers, the wafer with the monolayer is irradiated in a vacuum chamber ($p=10^{-6}$ to $10^{-9}$ mbar) with a "Leybold flood gun" (model 869000) with electrons of energy 100 eV and a dose of 40,000 $\mu C/cm^2$. After removal from the vacuum chamber, the layer can be immediately used for its intended application or be chemically functionalized further.

Example A2

After a surface of stainless steel has been cleaned several times with conventional organic detergent solutions and rinsed several times with deionized water, a monolayer of terphenyl-4-phosphonic acid is prepared by treating the cleaned surface with a 1 mmolar solution of terphenyl phosphonic acid in dimethylformamide. After 12 hours, the monolayer is formed and the steel substrate is rinsed once each with pure dimethylformamide and with deionized water. Subsequently, the monolayer is irradiated and crosslinked as in Example 1. Here, the electron energy can be increased up to 200 eV. A dose of 30,000 $\mu C/cm^2$ is sufficient for complete crosslinking.

Example A3

A silicon gear with a diameter of 500 μm is placed in a mixture of 3 parts of 30% hydrogen peroxide and 1 part conc. sulfuric acid for 1 min. Subsequently, it is rinsed with deionized water and placed in a 1 mmolar solution of 4-trichlorosilylbiphenyl in tetrahydrofuran. After two hours, the gear is taken out, rinsed with tetrahydrofuran, dried in a stream of nitrogen and subjected to the same irradiation and crosslinking procedure as in Example 1. A stable and continuously crosslinked surface layer is obtained, which effectively protects the gear against mechanical abrasion.

Example A4

By analogy with Example 1, monolayers of 4,4'-nitrobiphenylthiol are prepared on a gold surface. Before irradiation, the layer is covered with a metallic shadow mask. After irradiation, carried out as in Example 1, the nitro groups at the exposed spots have been converted to amino groups and the layer is crosslinked at those spots. The remaining areas of the layer, which are covered by the mask, remain unchanged. The amino groups formed by the irradiation can e.g. be acylated by subsequent treatment with an isocyanate, acid chloride or acid anhydride from solution in an organic solvent, such as tetrahydrofuran or acetone.

B) Preparation of Graphite Layers by Heating of a Laterally Crosslinked Monolayer Under Vacuum to a Temperature of >800 K

Example B1

A laterally crosslinked monolayer of 4'-[(3-trimethoxysilyl)propoxy]-[1,1'-biphenyl]-4-carbonitrile, which is prepared on silicon nitride, is transferred to a platinum grid and heated to 1500 K at $10^{-5}$ mbar.

Example B2

A laterally crosslinked monolayer of 4-biphenylthiol, which is prepared on gold, is transferred to a platinum substrate and heated to 1800 K at $10^{-8}$.

Example B3

A laterally crosslinked monolayer of 4-biphenylthiol, which is prepared on gold, is transferred to an iridium substrate and heated to 2000 K at $10^{-6}$.

After heating to the respectively indicated temperature under the corresponding pressure, the graphite layers formed in Examples B1 to B3 exhibit the desired properties, such as a thickness of <2 nm and electrical conductivity.

The invention claimed is:

1. A method for preparing a graphene layer composed of carbon consisting of one atomic layer, consisting of the step of heating a laterally cross-linked monolayer of low-molecular weight aromatics and/or low-molecular weight heteroaromatics under vacuum or inert gas to a temperature of greater than 1000K to form a graphene layer composed of carbon consisting of one atomic layer.

2. The method according to claim 1, wherein the monolayer is composed of aromatics selected from the group consisting of phenyl, biphenyl, terphenyl, naphthalene and anthracene, and/or of heteroaromatics selected from the group consisting of bipyridine, terpyridine, thiophene, bithienyl, terthienyl and pyrrole.

3. The method according to claim 1, wherein the low-molecular weight aromatics and/or low-molecular weight heteroaromatics have anchor groups.

4. The method according to claim 3, wherein the anchor groups are selected from the group consisting of carboxy, thio, trichlorosilyl, trialkoxysilyl, phosphonate, hydroxamic acid and phosphate groups.

5. The method according to claim 3, wherein the anchor groups are covalently bonded to the laterally crosslinked monolayer composed of low-molecular weight aromatics and/or low-molecular weight heteroaromatics by means of a spacer with a length of 1 to 10 methylene groups.

6. The method according to claim 1, wherein the laterally cross-linked monolayer is physisorbed or chemisorbed on a substrate, or is present in a free-standing manner.

7. The method according to claim 6, wherein the substrate has recesses in some areas.

8. The method according to claim 6, wherein the substrate is selected from the group consisting of gold, silver, titanium, zirconium, vanadium, chromium, manganese, tungsten, molybdenum, platinum, aluminum, iron, steel, silicon, germanium, indium phosphide, gallium arsenide and oxides or alloys or mixtures thereof, as well as graphite, indium tin oxide (ITO) and silicate or borate glasses.

9. The method according to claim 1, wherein the monolayer composed of low-molecular weight aromatics and/or low-molecular weight heteroaromatics carries functional groups on its surface, the groups being selected from halogen atoms, carboxy, trifluoromethyl, amino, nitro, cyano, thiol, hydroxy or carbonyl groups.

10. The method according to claim 1, wherein the monolayer is composed of biphenyl units, and the anchor groups of thio groups.

11. The method according to claim 1, wherein heating is carried out under vacuum in a pressure range from $10^{-7}$ mbar to $10^{-12}$ mbar.

12. The method according to claim 1, wherein heating is carried out under inert gas.

13. The method according to claim 1, wherein heating of the laterally cross-linked monolayer is carried out at a temperature of greater than 1600 K.

\* \* \* \* \*